US010223545B1

(12) United States Patent
Chakraborty et al.

(10) Patent No.: US 10,223,545 B1
(45) Date of Patent: Mar. 5, 2019

(54) SYSTEM AND METHOD FOR CREATING SECURITY SLICES WITH STORAGE SYSTEM RESOURCES AND RELATED OPERATIONS RELEVANT IN SOFTWARE DEFINED/AS-A-SERVICE MODELS, ON A PURPOSE BUILT BACKUP APPLIANCE (PBBA)/PROTECTION STORAGE APPLIANCE NATIVELY (71) Applicant: EMC Corporation, Hopkinton, MA (US)

(72) Inventors: Subhasish Chakraborty, Livermore, CA (US); Richa Saraf, San Jose, CA (US); Ephraim Dror, Cupertino, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 252 days.

(21) Appl. No.: 15/267,754

(22) Filed: Sep. 16, 2016

Related U.S. Application Data (63) Continuation of application No. 14/533,437, filed on Nov. 5, 2014, now Pat. No. 9,471,807.

(51) Int. Cl.
*G06F 21/62* (2013.01)
(52) U.S. Cl.
CPC ................. *G06F 21/6227* (2013.01)
(58) Field of Classification Search
CPC .. G06F 21/60; G06F 21/6209; G06F 21/6218; G06F 21/6227; G06F 2221/2141; G06F 17/30165; G06F 11/1448; G06F 11/1458; H04L 63/10; H04L 63/101; H04L 63/102
See application file for complete search history.

(56) References Cited

U.S. PATENT DOCUMENTS

| | | | |
|---|---|---|---|
| 6,810,396 B1 | 10/2004 | Blumenau et al. | |
| 7,913,300 B1 | 3/2011 | Flank et al. | |
| 8,549,350 B1 | 10/2013 | Dutch et al. | |
| 8,612,696 B2 | 12/2013 | Zhu et al. | |
| 8,635,184 B2 | 1/2014 | Hsu et al. | |
| 2003/0009444 A1 | 1/2003 | Eidler et al. | |
| 2009/0276833 A1 | 11/2009 | Paul et al. | |
| 2015/0082081 A1 | 3/2015 | Akirav et al. | |
| 2016/0028737 A1* | 1/2016 | Srinivasan | H04L 63/0807 726/1 |

\* cited by examiner

*Primary Examiner* — Minh Dinh
(74) *Attorney, Agent, or Firm* — Womble Bond Dickinson (US) LLP (57) ABSTRACT

A request is received from a first agent, the request having a filesystem namespace and an operation identifier (ID) identifying one or more operations to be performed within the file system namespace. In response to the request, a security unit is identified based on a first agent ID identifying the first agent. It is determined whether the security unit contains an operation set ID corresponding to the operation ID of the request. It is determined whether the security unit contains information identifying a set of one or more file system management object (FSMOs) associated with the requested filesystem namespace. The one or more operations are allowed to be performed on the one or more FSMOs, in response to determining that the security unit contains information matching the operation ID of the request and the filesystem namespace of the first request.

21 Claims, 12 Drawing Sheets

Receive a request to disassociate a namespace from a security unit (SU), wherein the namespace is mapped to a file system management object (FSMO) identified by a FSMO ID, and wherein the SU is identified by a SU identifier (ID)
705

↓

Determine that the SU ID and the FSMO ID exist in a persistent entry in the security config-metadata store
710

↓

Decrement a reference count associated with the FSMO ID, and in response to determining the reference count is zero, remove the FSMO ID from the persistent entry in the security config-metadata store containing the SU ID
715

Receive a request to assign a set of one or more operations to a security unit (SU), wherein the SU is identified by a SU identifier (ID), and wherein each of the one or more operations is identified by an operation ID
1005

Determine that the SU ID exists in a persistent entry of the security config-metadata store
1010

Generate an operation set ID for the set of one or more operations
1015

Store the association of the operation set ID and operation ID(s) identifying the one or more operations in an operation ID map
1020

Store the association of the SU ID and the generated operation set ID in the persistent entry of the security config-metadata store containing the SU ID
1025

Receive a request to un-assign a set of one or more operations from a security unit (SU), wherein the SU is identified by a SU identifier (ID), and wherein the set of one or more operations is identified by a operation set ID
1105

↓

Determine that the SU ID exists in a persistent entry of the security config-metadata store, and determine that the operation set ID exists in the operation ID map
1110

↓

Remove the operation set ID from the persistent entry in the security config-metadata store containing the SU ID
1115

SYSTEM AND METHOD FOR CREATING SECURITY SLICES WITH STORAGE SYSTEM RESOURCES AND RELATED OPERATIONS RELEVANT IN SOFTWARE DEFINED/AS-A-SERVICE MODELS, ON A PURPOSE BUILT BACKUP APPLIANCE (PBBA)/PROTECTION STORAGE APPLIANCE NATIVELY

RELATED APPLICATIONS

This application is a continuation of U.S. patent application Ser. No. 14/533,437, filed Nov. 5, 2014, which is incorporated by reference herein in its entirety.

FIELD

Embodiments of the present invention relate generally to data storage systems. More particularly, embodiments of the invention relate to creating security abstraction in data storage systems.

BACKGROUND

Conventionally, data storage systems have been used as Purpose Built Backup Appliances (PBBA), which communicate with backup agents/clients using protocols such as Network File System (NFS), Common Internet File System (CIFS), Virtual Tape Library (VTL), Network Data Management Protocol (NDMP), etc. for data movement (e.g., backup, replication, migration, restore, etc.) and related operations. Specifically for operations, protocols such as Secure Shell (SSH), Telnet, Hypertext Transfer Protocol (HTTP), HTTP Secure (HTTPS), etc., have been traditionally used. Security authorization related mechanisms natively supported by the data access protocols described above are adequate for traditional use-cases.

However, as the enterprise backup industry experiences a paradigm shift towards Software Defined Storage (SDS), Software Defined Data Center (SDDC), Software Defined Infrastructure (SDI) etc., the security authorization considerations for operations on storage systems have changed. Storage systems are now Cloud enabled, and are ready to be deployed in use cases which enable the storage systems to be used in "as a service" models. The problems and challenges faced with regards to security authorization for operations performed on storage system resources being exposed in this new and evolving paradigm are different. Conventional mechanisms are no longer sufficient to satisfy the security authorization concerns of such environments.

BRIEF DESCRIPTION OF THE DRAWINGS

Embodiments of the invention are illustrated by way of example and not limitation in the figures of the accompanying drawings in which like references indicate similar elements.

DESCRIPTION OF EMBODIMENTS

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

References in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Mechanisms for providing security slices natively in a data storage system (e.g., a PBBA) are described herein. Here, the term "natively" refers to the notion that the mechanisms are built into the operating system (OS) of the data storage system, as opposed to the use of application software executing on top of the data storage system OS. Embodiments of the present invention address the security authorization related concerns for operations on storage systems that are deployed in the SDS, SDDC, SDI, etc., environment.

Figure 1:
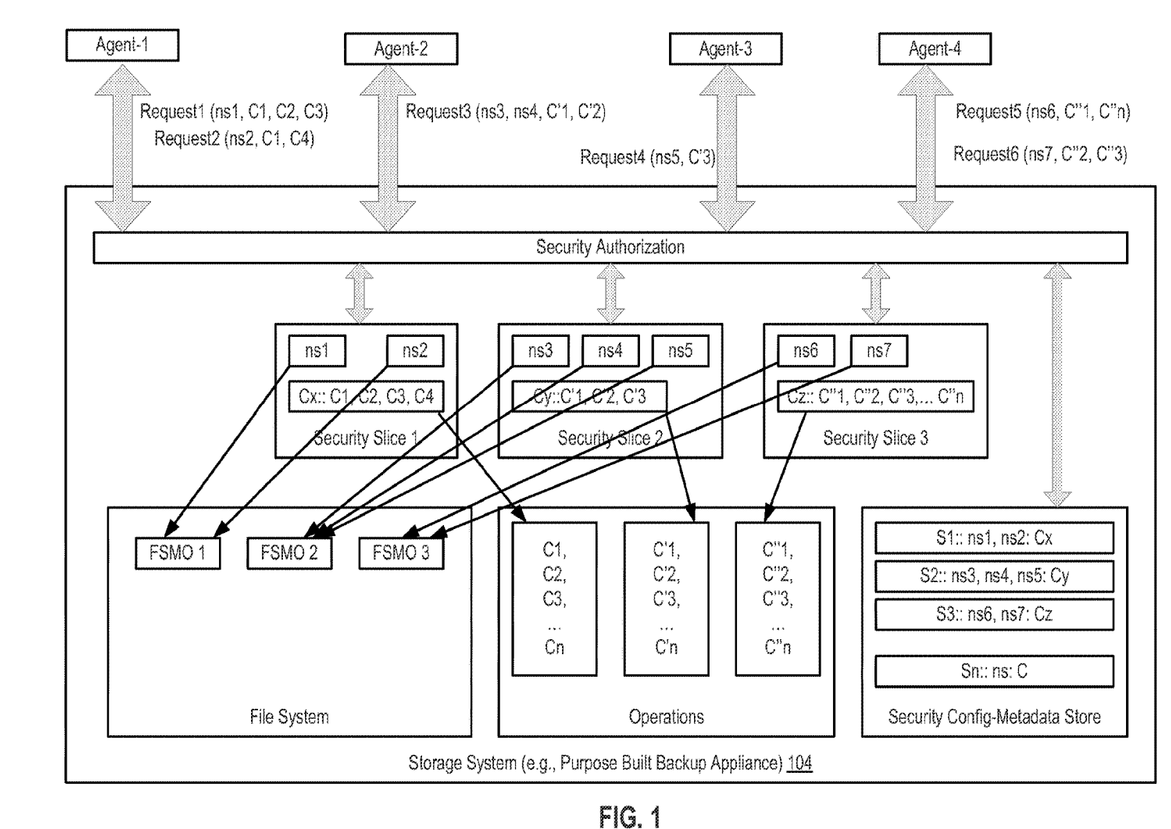
FIG. 1 is a block diagram illustrating a data storage system for providing security slices, according to one embodiment.

FIG. 1 is a block diagram illustrating a data storage system for providing security slices, according to one embodiment. For example, storage system 104 may be a PBBA deployed in a "software defined" architecture. In one embodiment, storage system 104 natively provides mechanisms built into its OS which enable storage system 104 to create security slices which serve as containers/slices/exposure-units/security authorization units (shown as security slices 1 through n), to which storage system resources and operations can be assigned. Thus, each security abstraction provides an association of one or more storage system resources with a set of one or more operations, wherein the set of one or more operations are collectively identified by a single operation set identifier (ID). As used herein, an association between a storage system resource and an operation means that the operation can be performed on the resource.

Storage system resources include, but are not limited to, storage resources (namespaces) and associated information related to configuration, control, and security. The storage system resources and the operations assigned to such security abstractions can vary depending on dynamic provisioning requirements. In one embodiment, storage system 104 provides mechanisms for assigning and un-assigning such entities to and from the security abstractions. In the illustrated example, security slice 1 contains namespaces ns1 and ns2, and operations C1 through C4, which are collectively identified by an operation set ID (shown as Cx).

As used herein, a namespace refers to the storage space or the object storage namespace. The namespace is the path used by storage applications/agents. In one embodiment, each namespace is mapped/associated with a file system management object (FSMO). As used herein, a "FSMO" refers to a unit of storage allocation that presents a unique and self-contained logical file system. Multiple namespaces can be mapped to the same FSMO. In the illustrated example, namespaces ns1 and ns2 are mapped to FSMO 1.

In one embodiment, storage system 104 stores such association information (i.e., the information contained in the security slices) in a separate persistent storage device (shown as the security config-metadata store). In the illustrated example, the security slices are stored in the security config-metadata store as security units S1 through Sn. A security unit, as used herein, is a data structure stored in a storage device which contains information associating resources to operations. In the illustrated example, security unit S1 contains information associating namespaces ns1 and ns2 with operations identified by operation set ID Cx. As will be described in further details below, the namespaces are mapped to FSMO IDs prior to being stored in the security unit. Such security abstractions can then be exposed to external agents (shown as agents 1 through n), which send requests for certain operations to be performed on objects/resources associated with the security abstractions.

As used herein, agents refer to external entities which are the consumers of the storage-space in a software defined environment. Examples of agents include, but are not limited to, backup applications, archival applications, replication applications, Snapshot managing and replicating applications, primary databases using storage space, Email servers using storage-space, consumer and enterprise users using storage-space for home directories.

In the illustrated example, the external agents (herein referred to simply as agents) send operation requests (shown as requests 1 through 6) to storage system 104. In one embodiment, each request includes one or more namespaces and further includes one or more operations (shown as C1 through C4, C'1 through C'3, and C"1 through C"3). In one embodiment, in response to receiving requests from the agents, the security authorization layer/module consults the security association information stored in the security config-metadata store to determine whether to allow or deny such requests. For example, storage system 104 determines whether the associated namespace and operations in the received request message match any of the association in the security unit contained in the security config-metadata store. If so, the request is allowed. Otherwise, the request is denied. Various embodiments of the present invention shall become apparent through the discussion of various other figures below.

Figure 2:
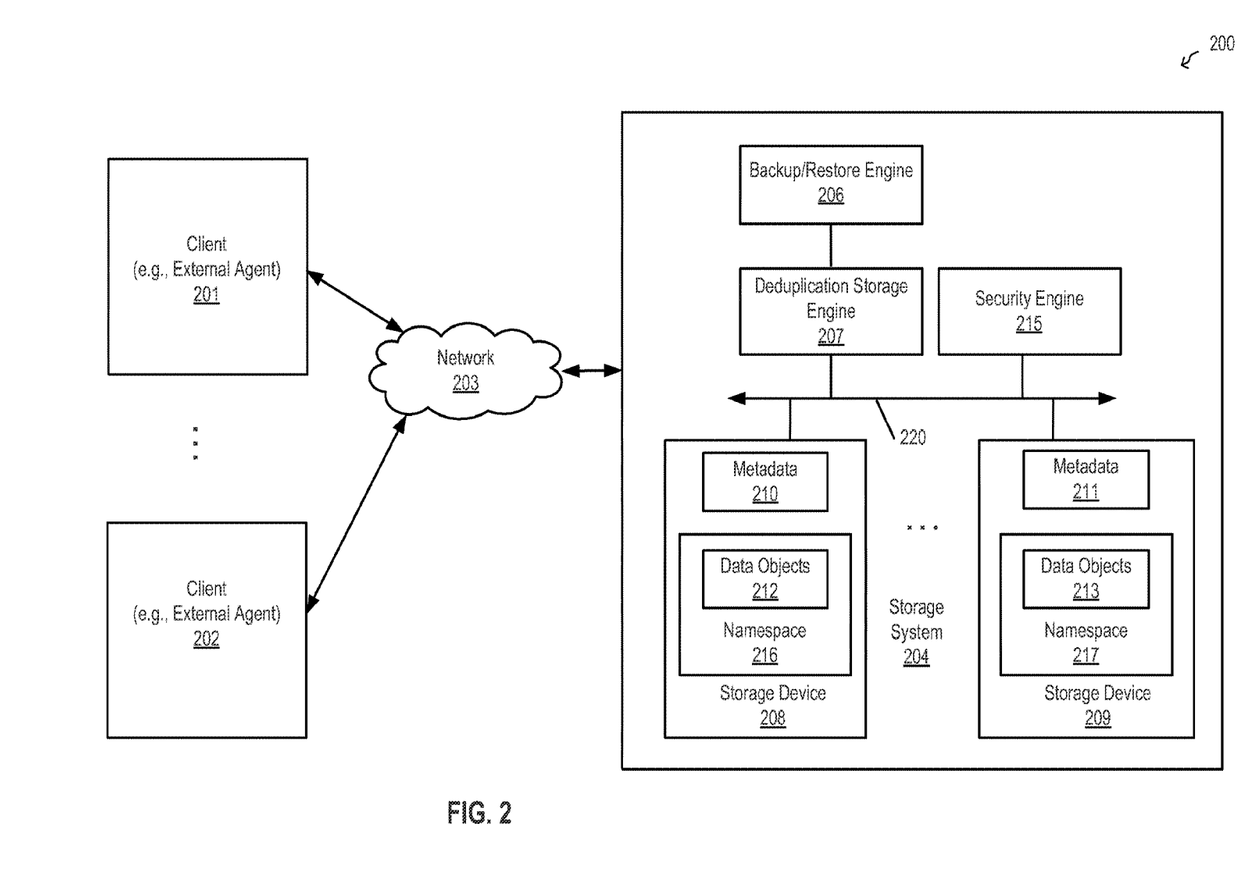
FIG. 2 is a block diagram illustrating a storage system according to one embodiment of the invention.

FIG. 2 is a block diagram illustrating a storage system according to one embodiment of the invention. For example, storage system 204 may be implemented as part of storage system 104. Referring now to FIG. 2, system 200 includes, but is not limited to, one or more client systems 201-202 communicatively coupled to storage system 204 over network 203. Clients 201-202 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 203 may be any type of networks such as a local area network (LAN), a wide area network (WAN) such as Internet, a corporate intranet, a metropolitan area network (MAN), a storage area network (SAN), a bus, or a combination thereof, wired and/or wireless. For example, client 201 may represent a first agent. For example, client 201 may include a software entity (e.g., a backup client, management entity, etc.) serving as an agent to storage system 204. Client 202 may represent a second agent. In FIG. 2, each of client devices 201-202 represents one agent. It should be understood, however, that a client device may represent multiple agents.

Storage system 204 may include any type of server or cluster of servers. For example, storage system 204 may be a storage server used for any of various different purposes, such as to provide multiple users with access to shared data and/or to back up mission critical data. Storage system 204 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 204 may have a distributed architecture, or all of its components may be integrated into a single unit. Storage system 204 may be implemented as part of an archive and/or backup system such as a deduplicating storage system available from EMC® Corporation of Hopkinton, Mass.

In one embodiment, storage system 204 includes, but is not limited to, backup/restore engine 206, deduplication storage engine 207, and one or more storage devices 208-209 communicatively coupled to each other. Storage devices 208-209 may be implemented locally (e.g., single node operating environment) or remotely (e.g., multi-node operating environment) via interconnect 220, which may be a bus and/or a network. In one embodiment, one of the storage devices 208-209 operates as an active storage to receive and store external or fresh user data, while the other storage devices operates as a target storage device to periodically archive data from the active storage device according to an archiving policy or scheme. Storage devices 208-209 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage devices 208-209 may also be a combination of such devices. In the case of disk storage media, the storage devices 208-209 may be organized into one or more volumes of Redundant Array of Inexpensive Disks (RAID).

In response to a data file to be stored in storage devices 208-209, deduplication storage engine 207 is configured to segment the data file into multiple chunks according to a variety of segmentation policies or rules. Deduplication storage engine 207 may choose not to store a chunk in a storage device if the chunk has been previously stored in the storage device. In the event that deduplication storage engine 207 chooses not to store the chunk in the storage device, it stores metadata enabling the reconstruction of the file using the previously stored chunk. As a result, chunks of data files are stored in a deduplicated manner, either within each of storage devices 208-209 or across at least some of storage devices 208-209. Data stored in the storage devices may be stored in a compressed form (e.g., lossless compression: Huffman coding, Lempel-Ziv Welch coding; delta encoding: a reference to a chunk plus a difference; etc.). In one embodiment, different storage devices may use different compression methods (e.g., main or active storage device from other storage devices, one storage device from another storage device, etc.).

The metadata, such as metadata 210-211, may be stored in at least some of storage devices 208-209, such that files can be accessed independent of another storage device. Metadata of each storage device includes enough information to provide access to the files it contains. In one embodiment, metadata may include fingerprints contained within data objects 212-213 (which are stored as part of namespaces 216-217, respectively), where a data object may represent a data chunk, a compression region (CR) of data chunks, or a container of one or more CRs. Fingerprints are mapped to a particular data object via metadata 210-211, enabling the system to identify the location of the data object containing a chunk represented by a particular fingerprint. When an active storage device fails, metadata contained in another storage device may be utilized to recover the active storage device. When one storage device is unavailable (e.g., the storage device has failed, or is being upgraded, etc.), the system remains up to provide access to any file not stored in the failed storage device. When a file is deleted, the metadata associated with the files in the system is updated to reflect that the file has been deleted.

In one embodiment, the metadata information includes a file name, a storage device where the chunks associated with the file name are stored, reconstruction information for the file using the chunks, and any other appropriate metadata information. In one embodiment, a copy of the metadata is stored on a storage device for files stored on a storage device so that files that are stored on the storage device can be accessed using only the information stored on the storage device. In one embodiment, a main set of metadata information can be reconstructed by using information of other storage devices associated with the storage system in the event that the main metadata is lost, corrupted, damaged, etc. Metadata for a storage device can be reconstructed using metadata information stored on a main storage device or other storage device (e.g., replica storage device). Metadata information further includes index information (e.g., location information for chunks in storage devices, identifying specific data objects).

In one embodiment, the storage system as shown in FIG. 2 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

According to one embodiment, backup/restore engine 206 is responsible for backing up data from remote clients (e.g., clients 201-202) to one or more local storage devices (e.g., storage devices 208-209). Backup/restore engine 206 is also responsible for restoring and/or replicating data from one or more local storage devices to the remote clients.

In one embodiment, storage system 204 includes security engine 215 for generating the security slices described above. In response to receiving operation requests from agents (e.g., clients 201-202), security engine 215 determines whether to allow or deny the requests based on the generated security slices. Embodiments of security engine 215 shall become apparent through the discussion of other figures below.

Figure 3:
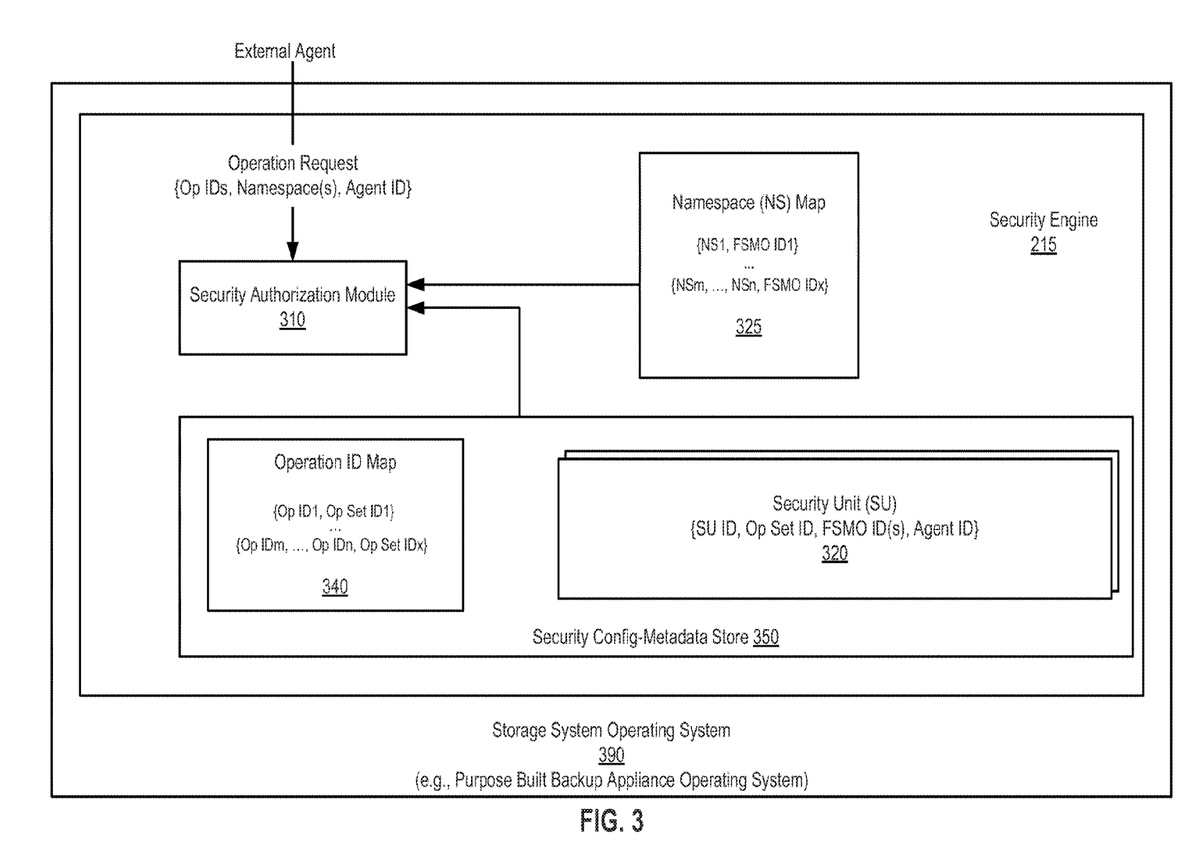
FIG. 3 is a block diagram illustrating a security engine for providing security abstractions according to one embodiment.

FIG. 3 is a block diagram illustrating security engine 215, which is implemented as part of storage system OS 390 (e.g., a PBBA OS). For example, storage system OS 390 can be executed by one or more processors of storage system 204. Referring now to FIG. 3, security engine 215 includes security authorization module 310 for receiving operation requests from agents. In one embodiment, each operation request includes, but is not limited to, one or more operation IDs, wherein each operation ID identifies an operation that is being requested by the agent. The request further contains one or more namespaces, on which the requested operations are to be performed. In one embodiment, each operation request further includes an agent ID which identifies the requesting agent (i.e., the agent that sent the request message). It should be understood that the operations and agents in the system have each been assigned a unique ID.

In one embodiment, security authorization module 310 is configured to determine whether to allow or deny a request based on information contained in namespace map 325 and security config-metadata store 350 (e.g., operation ID map 340 and the security units (SUs)). In one embodiment, namespace map 325 contains information associating/mapping namespaces to FSMO IDs. For example, namespace map 325 may be implemented as a data structure which is stored in a persistent storage device accessible by security engine 215. For example, namespace map 325 may include multiple persistent entries, wherein each entry contains one or more namespaces and a FSMO ID, thus creating a mapping/association of the one or more namespaces with the FSMO ID. It should be noted here that more than one namespace can be mapped to the same FSMO ID. In one embodiment, each FSMO ID is associated with a reference count (not shown) which indicates the number of namespaces that are mapped to the respective FSMO ID. In the illustrated example, namespace map 325 contains information/entries mapping namespace NS1 to FSMO ID1, and namespaces NSm . . . NSn to FSMO IDx.

In one embodiment, operation ID map 340 contains information associating/mapping operation IDs to operation set IDs. For example, operation ID map 340 may be implemented as a data structure which is stored in a persistent storage device accessible by security engine 215. For example, operation ID map 340 may include multiple persistent entries, wherein each entry contains one or more operation IDs and an operation set ID, thus creating a mapping/association of the one or more operation IDs with the operation set ID. Thus, it should be noted here that one or more operation IDs can be mapped into the same operation set ID. In the illustrated example, operation ID map 340 contains information/entries mapping operation ID1 to operation set ID1, and operation IDm . . . operation IDn to operation set IDx.

According to one embodiment, security config-metadata store 350 includes a plurality of security units (SUs). In one embodiment, each SU is implemented as a persistent entry of security config-metadata store 350, wherein each persistent entry is stored in a persistent storage device accessible by security engine 215. In one such embodiment, each entry includes, but is not limited to, an SU ID, an operation set ID, one or more FSMO IDs, and an agent ID. The agent ID identifies an agent which is allowed to perform the operations identified by the operation set ID on the FSMO(s) identified by the FSMO ID(s).

According to one embodiment, in response to receiving a request message from an agent, security authorization module 310 maps the operation ID(s) included in a request message to an operation set ID using operation ID map 340, and maps the namespace(s) included in the request message to one or more FSMO IDs using namespace map 325. According to one embodiment, security authorization module 310 creates an association of the operation set ID (derived based on the operation ID(s) included in the request message), the FSMO ID(s) (derived based on the namespace(s) included in the request message), and the agent ID (included in the request message), and stores the association in memory.

Security authorization module 310 then iterates through each SU entry in the security config-metadata store 350 to determine if any of the SU entries contains an association that matches the association created based on the request message. If so, security authorization module 310 allows the request, and causes storage 204 to perform the requested operations on the requested namespaces. Otherwise, security authorization module 310 denies the request. It should be understood that a "match" refers to the operation set ID, the FSMO ID(s), and the agent ID in the SU entry matching the operation set ID, the FSMO ID(s), and the agent ID that were derived based on the request message. Thus, if either the operation set ID, or any of the FSMO ID(s), or the agent ID of a SU entry does not match the operation set ID, the FSMO ID(s), and the agent ID which were created based on the request message, then there is a mismatch.

Figure 4:
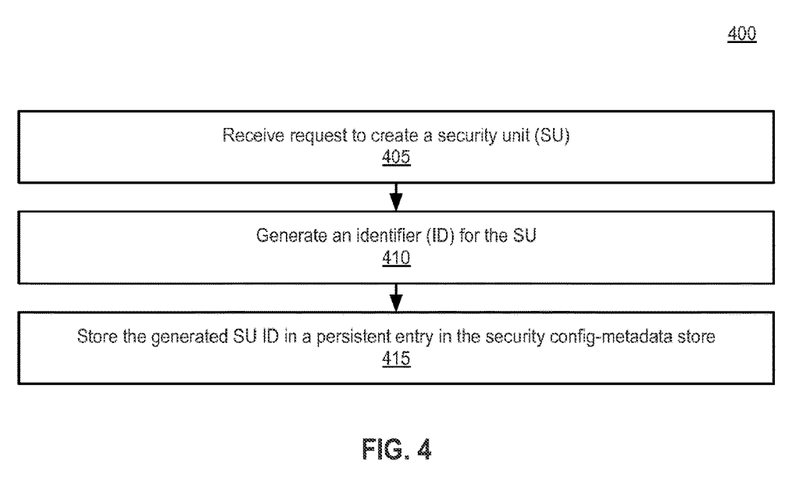
FIG. 4 is a flow diagram illustrating a method for creating a SU according to one embodiment.

FIG. 4 is a flow diagram illustrating a method for creating a SU according to one embodiment. For example, method 400 can be performed by security engine 215. Method 400 can be implemented in software, firmware, hardware, or any combination thereof. Referring now to FIG. 4, at block 405, a security engine receives a request to create a SU. At block 410, the security engine generates an ID for the SU. At block 415, the security engine stores the generated SU ID in a persistent entry in the security config-metadata store. By way of example, the security engine may create a new entry (i.e., a SU) in a storage device, and store the generated SU ID as part of the entry (i.e., the SU).

Figure 5:
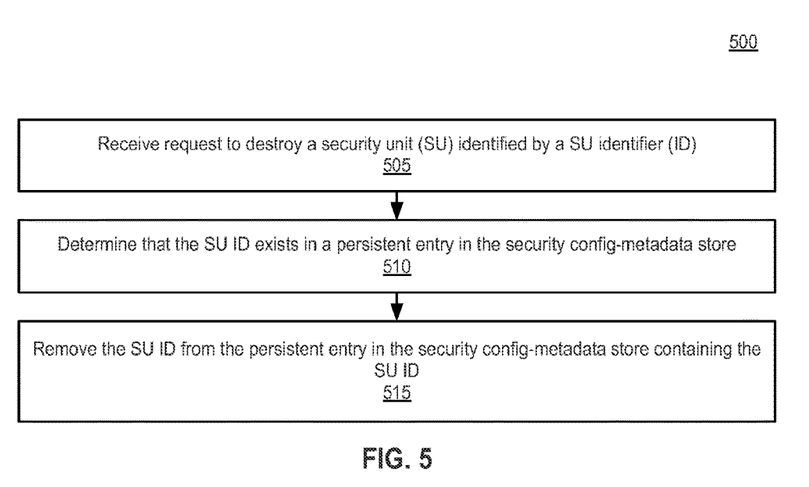
FIG. 5 is a flow diagram illustrating a method for destroying a SU according to one embodiment.

FIG. 5 is a flow diagram illustrating a method for destroying a SU according to one embodiment. For example, method 500 can be performed by security engine 215. Method 500 can be implemented in software, firmware, hardware, or any combination thereof. Referring now to FIG. 5, at block 505, a security engine receives a request to destroy a SU identified by a SU ID. At block 510, the security engine determines that the SU ID exists in a persistent entry of the config-metadata store. For example, security engine 215 determines that the SU ID specified as part of the request is contained in SU 320. At block 515, the security engine removes the SU ID from the persistent entry of the security config-metadata store containing the SU ID. Continuing on with the above example, security engine 215 removes the specified SU ID from SU 320.

Figure 6:
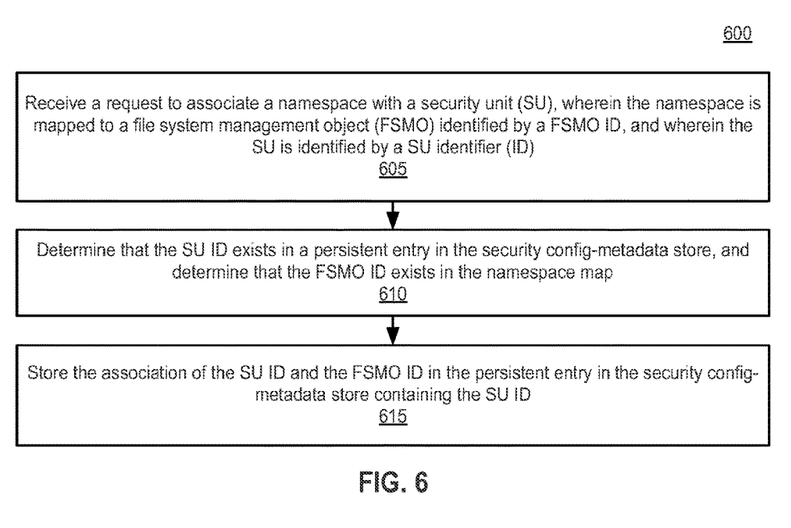
FIG. 6 is a flow diagram illustrating a method for associating a storage namespace with a SU, according to one embodiment.

FIG. 6 is a flow diagram illustrating a method for associating a storage namespace with a SU, according to one embodiment. For example, method 600 can be performed by security engine 215. Method 600 can be implemented in software, firmware, hardware, or any combination thereof. Referring now to FIG. 6, at block 605, a security engine receives a request to associate a namespace with a SU, wherein the namespace is mapped to a FSMO identified by a FSMO ID, and wherein the SU is identified by a SU ID. At block 610, the security engine determines that the SU ID exists in a persistent entry of the security config-metadata store. For example, security engine 215 determines that the SU ID specified as part of the request is contained in SU 320. As part of block 610, the security engine further determines that the FSMO ID mapped from the namespace exists in a namespace map. For example, security engine 215 determines that the FSMO ID exists in namespace map 325. At block 615, the security engine stores the association of the SU ID and the FSMO ID in the persistent entry of the security config-metadata store containing the SU ID. Continuing on with the above example, security engine 215 stores the specified SU ID and the FSMO ID (mapped to the requested namespace) in SU 320.

Figure 7:
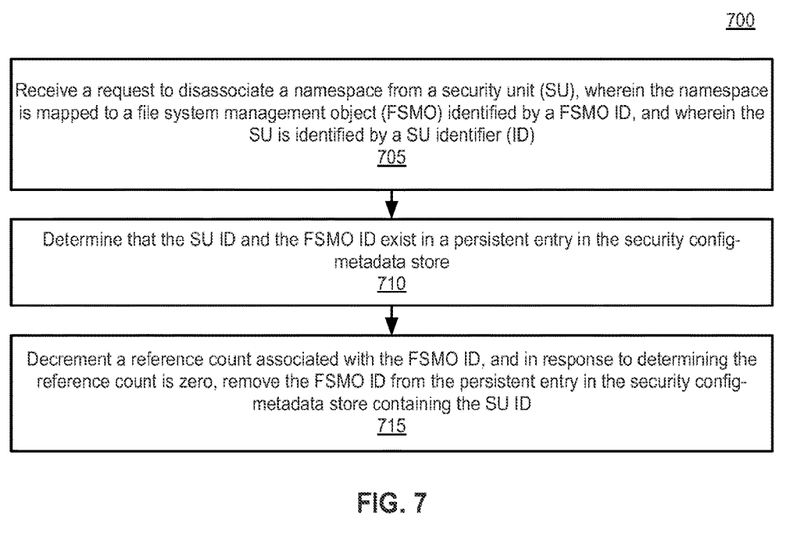
FIG. 7 is a flow diagram illustrating a method for disassociating a storage namespace from a SU, according to one embodiment.

FIG. 7 is a flow diagram illustrating a method for disassociating a storage namespace from a SU, according to one embodiment. For example, method 700 can be performed by security engine 215. Method 700 can be implemented in software, firmware, hardware, or any combination thereof. Referring now to FIG. 7, at block 705 a security engine receives a request to disassociate a namespace from a SU, wherein the namespace is mapped to a FSMO identified by a FSMO ID, and wherein the SU is identified by a SU ID.

At block 710, the security engine determines that the SU ID and the FSMO ID to which the namespace is mapped, exists in a persistent entry of the security config-metadata store. For example, security engine 215 determines that the specified SU ID and the FSMO ID mapped from the namespace exist in SU 320. At block 715, the security engine decrements a reference count associated with the FSMO ID, and in response to determining that the reference count is zero (indicating there are no other namespaces mapped to the FSMO ID), the security engine removes the FSMO ID from the persistent entry of the security config-metadata store containing the SU ID. Continuing on with the above example, security engine 215 removes the FSMO ID from SU 320.

Figure 8:
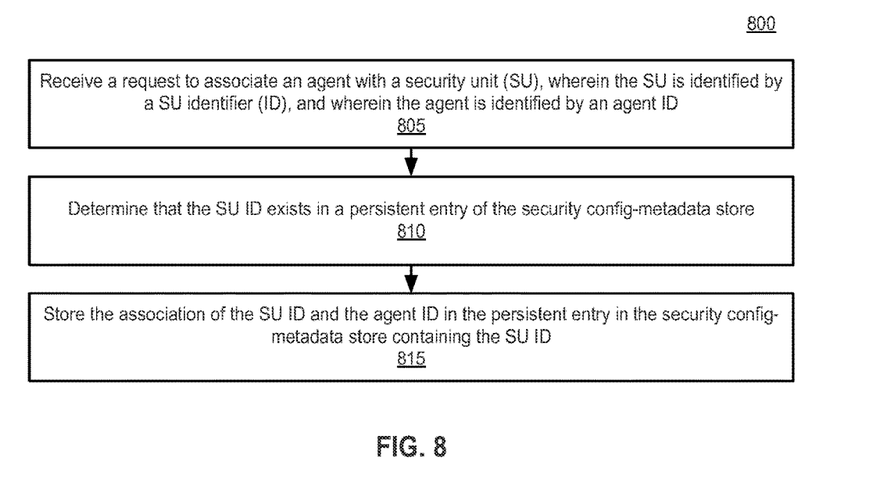
FIG. 8 is a flow diagram illustrating a method for associating an agent with a SU, according to one embodiment.

FIG. 8 is a flow diagram illustrating a method for associating an agent with a SU, according to one embodiment. For example, method 800 can be performed by security engine 215. Method 800 can be implemented in software, firmware, hardware, or any combination thereof. Referring now to FIG. 8, at block 805 a security engine receives a request to associate an agent with a SU, wherein the SU is identified by a SU ID, and wherein the agent is identified by an agent ID.

At block 810, the security engine determines that the specified SU ID exists in a persistent entry of the security config-metadata store. For example, security engine 215 determines that the specified SU ID exists in SU 320. At block 815, the security engine stores the association of the specified SU ID and the specified agent ID in the persistent entry of the security config-metadata store containing the SU ID. Continuing on with the above example, security engine 215 stores the SU ID and the agent ID in SU 320.

Figure 9:
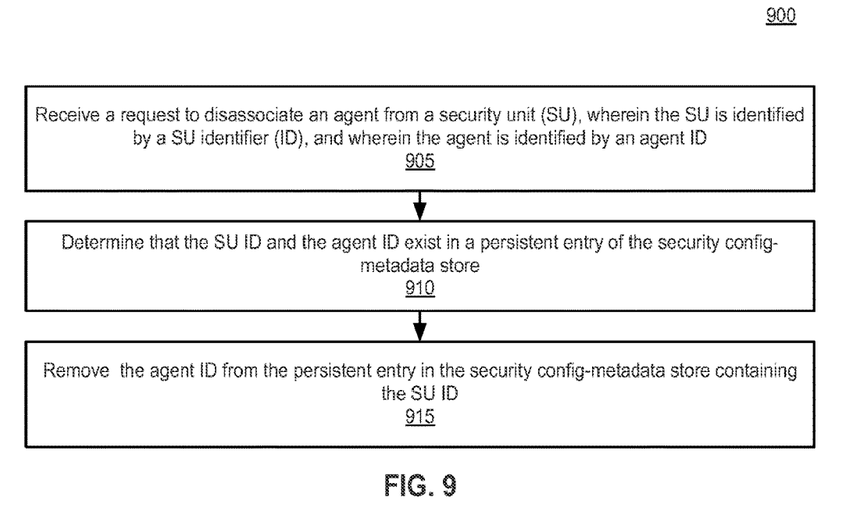
FIG. 9 is a flow diagram illustrating a method for disassociating an agent from a SU, according to one embodiment.

FIG. 9 is a flow diagram illustrating a method for disassociating an agent from a SU, according to one embodiment. For example, method 900 can be performed by security engine 215. Method 900 can be implemented in software, firmware, hardware, or any combination thereof. Referring now to FIG. 9, at block 905 a security engine receives a request to disassociate an agent from a SU, wherein the SU is identified by a SU ID, and wherein the agent is identified by an agent ID. At block 910, the security engine determines that the SU ID and the agent ID exist in a persistent entry of the security config-metadata store. For example, security engine 215 determines that the specified SU ID and the agent ID exist in SU 320. At block 915, the security engine removes the agent ID from the persistent entry of the security config-metadata store containing the SU ID. Continuing on with the above example, security engine 215 removes the agent ID from SU 320.

Figure 10:
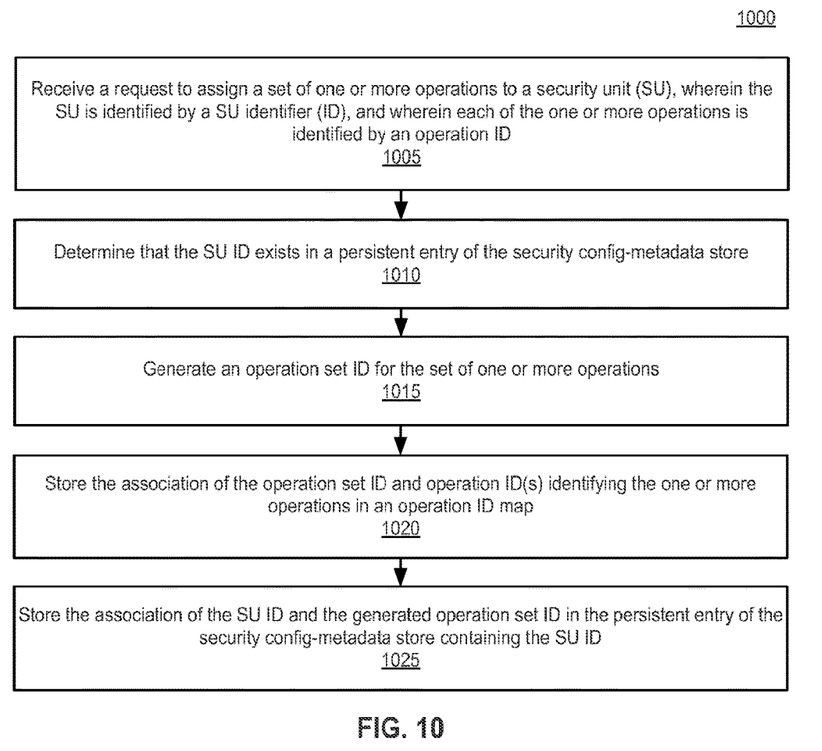
FIG. 10 is a flow diagram illustrating a method for assigning a set of one or more operations to a SU, according to one embodiment.

FIG. 10 is a flow diagram illustrating a method for assigning a set of one or more operations to a SU, according to one embodiment. For example, method 1000 can be performed by security engine 215. Method 1000 can be implemented in software, firmware, hardware, or any combination thereof. Referring now to FIG. 10, at block 1005 a security engine receives a request to assign a set of one or more operations to a SU, wherein the SU is identified by a SU ID, and wherein each of the one or more operations is identified by an operation ID.

At block 1010, the security engine determines that the SU ID exists in a persistent entry of the security config-metadata store. For example, security engine 215 determines that the specified SU ID exists in SU 320. At block 1015, the security engine generates an operation set ID for the set of one or more operation IDs identifying the set of one or more operations to be assigned to the SU. At block 1020, the security engine stores the association of the generated operation set ID and the set of one or more operation IDs in an operation ID map (e.g., operation ID map 340). At block 1025, the security engine stores the association of the specified SU ID and the generated operation set ID in the persistent entry of the security config-metadata store containing the SU ID. Continuing on with the above example, security engine 215 stores the specified SU ID and the generated operation set ID in SU 320.

Figure 11:
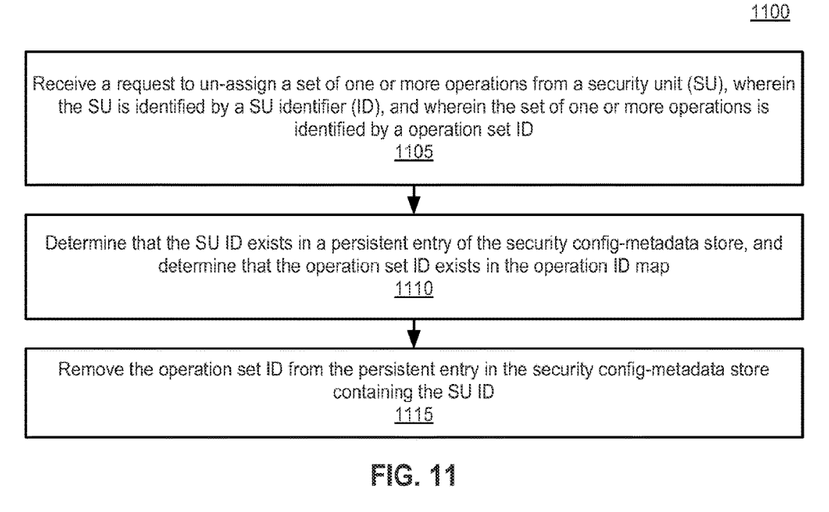
FIG. 11 is a flow diagram illustrating a method for un-assigning a set of one or more operations from a SU, according to one embodiment.

FIG. 11 is a flow diagram illustrating a method for un-assigning a set of one or more operations from a SU, according to one embodiment. For example, method 1100 can be performed by security engine 215. Method 1100 can be implemented in software, firmware, hardware, or any combination thereof. Referring now to FIG. 11, at block 1105 a security engine receives a request to un-assign a set of one or more operations from a SU, wherein the SU is identified by a SU ID, and wherein the set of one or more operations is identified by an operation set ID.

At block 1110, the security engine determines that the SU ID exists in a persistent entry of a security config-metadata store. For example, security engine 215 determines that the specified SU ID exists in SU 320. As part of block 1110, the security engine further determines that the operation set ID exists in an operation ID map. For example, security engine 215 determines that the specified operation set ID exists in operation ID map 340. At block 1115, the security engine removes the operation set ID from the persistent entry of the security config-metadata store containing the SU ID. Continuing on with the above example, security engine 215 removes the operation set ID from SU 320.

Figure 12:
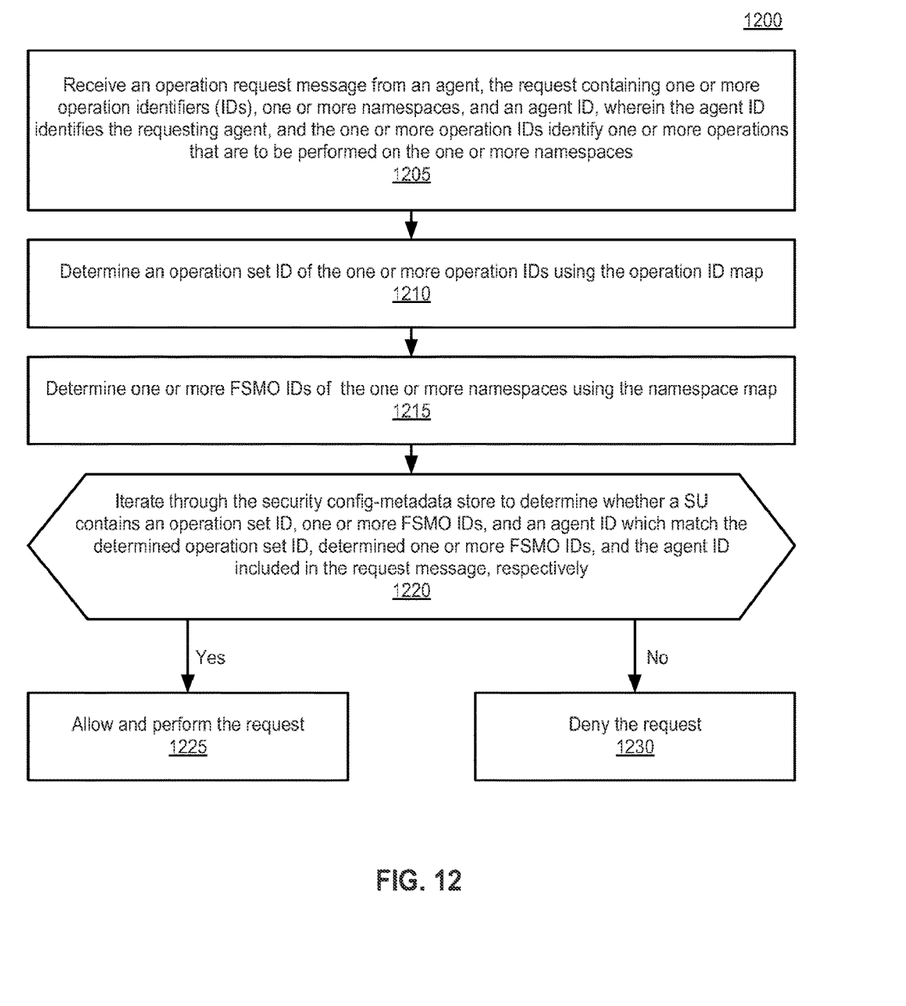
FIG. 12 is a flow diagram illustrating a method for determining whether an operation request from an agent should be allowed or denied, according to one embodiment.

FIG. 12 is a flow diagram illustrating a method for determining whether an operation request from an agent should be allowed or denied, according to one embodiment. For example, method 1200 can be performed by security engine 215. Method 1200 can be implemented in software, firmware, hardware, or any combination thereof. Referring now to FIG. 12, at block 1205 a security engine receives an operation request message from an agent, the request containing one or more operation identifiers (IDs), one or more namespaces, and an agent ID, wherein the agent ID identifies the requesting agent, and the one or more operation IDs identify one or more operations that are to be performed on the one or more namespaces.

At block 1210, the security engine determines an operation set ID of the one or more operation IDs using an operation ID map (e.g., operation ID map 340). At block 1215, the security engine determines one or more FSMO IDs of the one or more namespaces using a namespace map (e.g., namespace map 325). At block 1220, the security engine iterates through a security config-metadata store (e.g., security config-metadata store 350) to determine whether a SU contains an operation set ID, one or more FSMO IDs, and an agent ID which match the determined operation set ID, determined one or more FSMO IDs, and the agent ID included in the request message, respectively. At block 1225, in response to determining there is a match, the security engine allows the request and causes the storage system to perform the request. At block 1230, the security engine determines that there is no match and denies the request.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for authorizing operations to performed in a storage appliance, the method comprising:
    receiving a request from a first agent, the request having a file_system namespace and an operation identifier (ID) identifying one or more operations to be performed within the file system namespace;
    in response to the request, identifying a security unit based on a first agent ID identifying the first agent, wherein the security unit is built into an operating system of the storage appliance;
    determining whether the security unit contains an operation set ID corresponding to the operation ID of the request;
    determining whether the security unit contains information identifying a set of one or more file system management object (FSMOs) associated with the requested filesystem namespace; and
    allowing the one or more operations to be performed on the one or more FSMOs, in response to determining that the security unit contains information matching the operation ID of the request and the file_system namespace of the request.

2. The method of claim 1, further comprising denying the request in response to determining that the security unit does not contain the information matching the operation ID of the request or the filesystem namespace of the request.

3. The method of claim 1, wherein the security unit is one of a plurality of security units, and wherein each security unit includes an operation set ID identifying a set of one or more operations can be performed, a set of one or more FSMOs on which the operations can be performed, and an agent ID identifying an agent who can request performing the operations.

4. The method of claim 1, wherein determining whether the security unit contains an operation set ID corresponding to the operation ID of the request comprises:
    performing a lookup operation in an operation ID map based on the operation ID to locate a mapping entry matching the operation ID; and
    determining the operation set ID corresponding to the operation ID from the matching mapping entry.

5. The method of claim 4, wherein the operation ID map includes a plurality of mapping entries, each mapping entry mapping an operation ID to an operation set ID.

6. The method of claim 1, wherein determining whether the security unit contains information identifying a set of one or more FSMOs associated with the requested filesystem namespace comprises:
    performing a lookup operation in a namespace map based on the requested filesystem namespace to locate a mapping entry matching the requested filesystem namespace; and
    determining the FSMOs corresponding to the requested filesystem namespace from the matching mapping entry.

7. The method of claim 6, wherein the namespace map includes a plurality of mapping entries, each mapping entry mapping a filesystem namespace to a set of one or more FSMOs.

8. A non-transitory machine-readable medium having instructions stored therein, which when executed by a processor, cause the processor to perform operations of authorizing operations to performed in a storage appliance, the operations comprising:
    receiving a request from a first agent, the request having a filesystem namespace and an operation identifier (ID) identifying one or more operations to be performed within the file system namespace;
    in response to the request, identifying a security unit based on a first agent ID identifying the first agent, wherein the security unit is built into an operating system of the storage appliance;
    determining whether the security unit contains an operation set ID corresponding to the operation ID of the request;
    determining whether the security unit contains information identifying a set of one or more file system management object (FSMOs) associated with the requested filesystem namespace; and
    allowing the one or more operations to be performed on the one or more FSMOs, in response to determining that the security unit contains information matching the operation ID of the request and the filesystem namespace of the request.

9. The machine-readable medium of claim 8, wherein the operations further comprise denying the request in response to determining that the security unit does not contain information matching the operation ID of the request or the filesystem namespace of the first request.

10. The machine-readable medium of claim 8, wherein the security unit is one of a plurality of security units, and wherein each security unit includes an operation set ID identifying a set of one or more operations can be performed, a set of one or more FSMOs on which the operations can be performed, and an agent ID identifying an agent who can request performing the operations.

11. The machine-readable medium of claim 8, wherein determining whether the security unit contains an operation set ID corresponding to the operation ID of the request comprises:
performing a lookup operation in an operation ID map based on the operation ID to locate a mapping entry matching the operation ID; and
determining the operation set ID corresponding to the operation ID from the matching mapping entry.

12. The machine-readable medium of claim 11, wherein the operation ID map includes a plurality of mapping entries, each mapping entry mapping an operation ID to an operation set ID.

13. The machine-readable medium of claim 8, wherein determining whether the security unit contains information identifying a set of one or more FSMOs associated with the requested filesystem namespace comprises:
performing a lookup operation in a namespace map based on the requested filesystem namespace to locate a mapping entry matching the requested filesystem namespace; and
determining the FSMOs corresponding to the requested filesystem namespace from the matching mapping entry.

14. The machine-readable medium of claim 13, wherein the namespace map includes a plurality of mapping entries, each mapping entry mapping a filesystem namespace to a set of one or more FSMOs.

15. A data processing system, comprising:
a processor; and
a memory coupled to the processor to store instructions, which when executed by the processor, cause the processor to perform operations of authorizing operations to performed in a storage appliance, the operations including
receiving a request from a first agent, the request having a filesystem namespace and an operation identifier (ID) identifying one or more operations to be performed within the file system namespace,
in response to the request, identifying a security unit based on a first agent ID identifying the first agent, where security unit is built into an operating system of the storage appliance,
determining whether the security unit contains an operation set ID corresponding to the operation ID of the request,
determining whether the security unit contains information identifying a set of one or more file system management object (FSMOs) associated with the requested filesystem namespace, and
allowing the one or more operations to be performed on the one or more FSMOs, in response to determining that the security unit contains information matching the operation ID of the request and the filesystem namespace of the request.

16. The system of claim 15, wherein the operations further comprise denying the request in response to determining that the security unit does not contain information matching the operation ID of the request or the filesystem namespace of the request.

17. The system of claim 15, wherein the security unit is one of a plurality of security units, and wherein each security unit includes an operation set ID identifying a set of one or more operations can be performed, a set of one or more FSMOs on which the operations can be performed, and an agent ID identifying an agent who can request performing the operations.

18. The system of claim 15, wherein determining whether the security unit contains an operation set ID corresponding to the operation ID of the request comprises:
performing a lookup operation in an operation ID map based on the operation ID to locate a mapping entry matching the operation ID; and
determining the operation set ID corresponding to the operation ID from the matching mapping entry.

19. The system of claim 18, wherein the operation ID map includes a plurality of mapping entries, each mapping entry mapping an operation ID to an operation set ID.

20. The system of claim 15, wherein determining whether the security unit contains information identifying a set of one or more FSMOs associated with the requested filesystem namespace comprises:
performing a lookup operation in a namespace map based on the requested filesystem namespace to locate a mapping entry matching the requested filesystem namespace; and
determining the FSMOs corresponding to the requested filesystem namespace from the matching mapping entry.

21. The system of claim 20, wherein the namespace map includes a plurality of mapping entries, each mapping entry mapping a filesystem namespace to a set of one or more FSMOs.

* * * * *